United States Patent
Konegger et al.

(10) Patent No.: US 7,742,779 B2
(45) Date of Patent: Jun. 22, 2010

(54) METHOD FOR SYNCHRONIZING A RADIO COMMUNICATION SYSTEM THAT IS DIVIDED UP INTO RADIO CELLS

(75) Inventors: Mario Konegger, Spittal an der Drau (AT); Walter Kunz, Matzendorf (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1052 days.

(21) Appl. No.: 10/563,942

(22) PCT Filed: Jun. 28, 2004

(86) PCT No.: PCT/EP2004/051269

§ 371 (c)(1),
(2), (4) Date: Jun. 5, 2006

(87) PCT Pub. No.: WO2005/006594

PCT Pub. Date: Jan. 20, 2005

(65) Prior Publication Data

US 2006/0252437 A1    Nov. 9, 2006

(30) Foreign Application Priority Data

Jul. 10, 2003   (DE)  ............................... 103 31 313

(51) Int. Cl.
*H04B 7/00*  (2006.01)
(52) U.S. Cl. .................. 455/502; 455/524; 455/561; 370/324; 370/350
(58) Field of Classification Search ............... 455/502, 455/524, 561, 562.1; 370/350, 324; 375/356
See application file for complete search history.

(56) References Cited

U.S. PATENT DOCUMENTS

| | | | | |
|---|---|---|---|---|
| 5,241,688 A | * | 8/1993 | Arora | 455/502 |
| 5,363,375 A | * | 11/1994 | Chuang et al. | 370/332 |
| 5,386,435 A | * | 1/1995 | Cooper et al. | 375/134 |
| 5,872,774 A | | 2/1999 | Wheatley, III et al. | |
| 5,889,759 A | * | 3/1999 | McGibney | 370/207 |
| 6,208,871 B1 | | 3/2001 | Hall et al. | |

(Continued)

FOREIGN PATENT DOCUMENTS

EP          0 732 817          9/1996

(Continued)

*Primary Examiner*—Sharad Rampuria
(74) *Attorney, Agent, or Firm*—Staas & Halsey LLP (57) ABSTRACT

A method synchronizes a radio communication system that is divided up into radio cells. According to the method, every radio cell has one base station each for the radio coverage of a plurality of mobile stations assigned to the radio cell. The base station receives, in addition to mobile station signals of its own radio cell, mobile station signals of neighboring radio cells. The base station determines, on the basis of the mobile station signals received, the number of mobile stations and compares this number with a defined threshold value. When the number determined falls below the threshold value, a first synchronization method for synchronizing the base station and the assigned mobile stations is used, the first method corresponding to an assigned transmission standard of the radio communication system. When the threshold value is exceeded, a second synchronization method is used for synchronizing the base station and the assigned mobile stations.

20 Claims, 4 Drawing Sheets

U.S. PATENT DOCUMENTS

| | | | |
|---|---|---|---|
| 6,760,599 B1* | 7/2004 | Uhlik | 455/525 |
| 6,836,518 B1* | 12/2004 | Sano et al. | 375/343 |
| 7,042,858 B1* | 5/2006 | Ma et al. | 370/331 |
| 7,062,282 B2* | 6/2006 | Liu et al. | 455/502 |
| 7,065,383 B1* | 6/2006 | Hovers et al. | 455/562.1 |
| 7,415,044 B2* | 8/2008 | Kallstenius | 370/516 |
| 7,548,506 B2* | 6/2009 | Ma et al. | 370/208 |
| 2002/0003848 A1 | 1/2002 | Wendorff | |
| 2003/0147362 A1* | 8/2003 | Dick et al. | 370/324 |
| 2005/0185628 A1* | 8/2005 | Watanabe et al. | 370/347 |
| 2005/0232135 A1* | 10/2005 | Mukai et al. | 370/208 |

FOREIGN PATENT DOCUMENTS

| | | |
|---|---|---|
| JP | 6-334593 | 12/1994 |
| JP | 2002-505542 | 2/2002 |
| WO | 00/35117 | 6/2000 |
| WO | 01/20818 | 3/2001 |

* cited by examiner

METHOD FOR SYNCHRONIZING A RADIO COMMUNICATION SYSTEM THAT IS DIVIDED UP INTO RADIO CELLS

CROSS REFERENCE TO RELATED APPLICATIONS

This application is based on and hereby claims priority to PCT Application No. PCT/EP2004/051269 filed on Jun. 28, 2004 and German Application No. 10331313.3 filed on Jul. 10, 2003, the contents of which are hereby incorporated by reference.

BACKGROUND OF THE INVENTION

The invention relates to a method for synchronizing a radio communication system divided up into radio cells.

In a cellular radio communication system the necessary multiple use of carrier frequencies in adjacent radio cells gives rise to what is termed "co-channel interference". In order to reduce this interference, the available carrier frequencies are assigned to individual carrier frequency sub-resources. Each carrier frequency sub-resource is then permanently allocated in each case to a radio cell with the aid of what is termed a "frequency reuse" planning method in such a way that only minimal co-channel interference is caused in the radio cells taking into account minimum physical distances between the radio cells.

Said fixed allocation of carrier frequencies or their transmission resources is disadvantageous in particular when an inhomogeneously distributed number of subscribers occurs in adjacent radio cells. A base station under consideration in one of the radio cells and having to provide coverage to an increased number of subscribers then has an increased demand for transmission resources. If this then gives rise to a lack of transmission resources, then subscribers in the radio cell under consideration who request a new data transmission are rejected.

Accordingly, with an increase in subscriber numbers increased co-channel interference occurs within the radio communication system, which interference can only be influenced to a limited extent by a specified "frequency-reuse factor" on account of the "frequency reuse" planning.

An increase in transmission resources, which is instigated for example in the case of major organized events by subsequent incorporation of further base stations, is not possible in a straightforward simple manner, due to the increase in co-channel interference. Where necessary, the complex and time-consuming "frequency reuse" planning technique must be applied once again.

The use of what are termed "orthogonal frequency division multiplexing" ("OFDM" for short) transmission technologies is gaining increasing significance in particular for future-generation mobile radio networks of cellular design. OFDM mobile radio networks of said type demand high data rates for services such as video transmissions, for instance, which can be transmitted cost-efficiently with the aid of said OFDM transmission technologies. With this approach, a plurality of what are termed "subcarrier frequencies" are used simultaneously in parallel with one another for transmitting a subscriber data stream. A wideband transmission channel is implemented by a plurality of radio transmission channels having a generally identical bandwidth. An OFDM mobile radio network of said kind is in turn to be embodied dependent on a "frequency reuse" planning method that is to be performed with regard to co-channel interference.

The wideband radio transmission channel is "time-dispersive" and is subject to frequency-selective fading, with the result that typically a complex equalization is required on the receive side. In an OFDM transmission the radio transmission channel is subdivided into a plurality of narrower subchannels, with the result that "flat fading" is experienced on each of the subchannels instead of frequency-selective fading, thereby enabling a very simple, typically "single-tap" equalization.

In the simplest case the same modulation scheme, and hence the same transmission bit rate, is assigned each time to each of these radio transmission channels, the assigned transmission bit rates being specified as a function of interference on the respective radio transmission channels. A higher-level modulation method is used for radio transmission channels with low interference than in radio transmission channels that exhibit higher interference. In this manner transmission can be performed with a required quality of service for each radio transmission channel, taking into account an error rate, for example. In the case of a line transmission in the baseband, an OFDM multi-carrier method of said kind is also known under the designation "discrete multitone transmission", or "DMT" for short.

Figure 3:
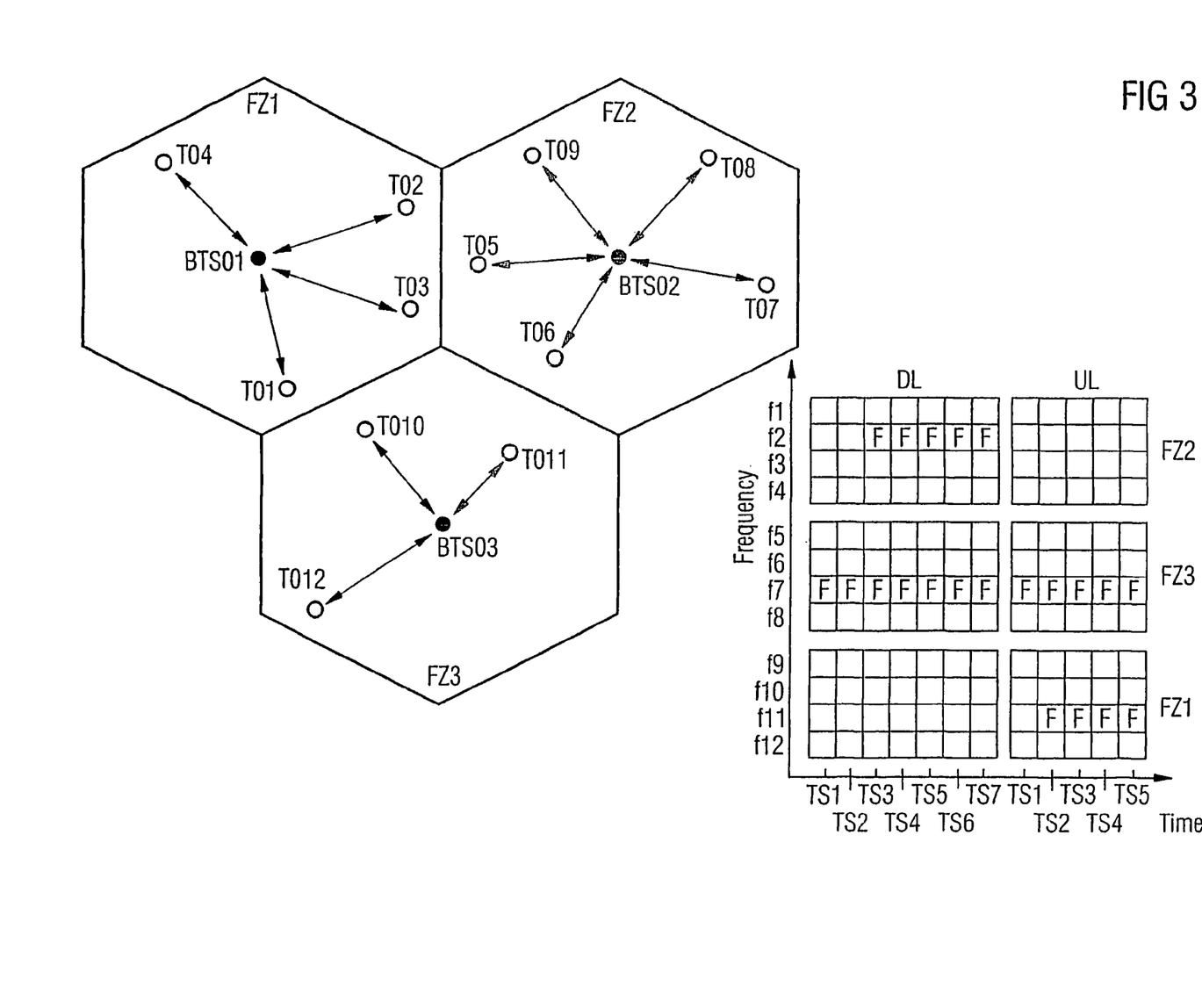
FIG. 3 shows the cellular OFDM radio communication system according to the related art described as a representative instance in the introduction to the description.

FIG. 3 shows a cellular OFDM radio communication system according to the related art as a representative instance of all mobile radio systems. Three adjacent radio cells FZ1 to FZ3 each have an assigned base station BTS01 to BTS03. Each individual station of said base stations BTS01 to BTS03 provides coverage to a number of the mobile stations T01 to T012 assigned to the respective radio cell FZ1 to FZ3, with a total of four carrier frequencies f9 to f12 being assigned by a "frequency reuse" planning method to a first base station BTS01 of a first radio cell FZ1, a total of four carrier frequencies f1 to f4 being assigned thereby to a second base station BTS02 of a second radio cell FZ2, and a total of four carrier frequencies f5 to f8 being assigned thereby to a third base station BTS03 of a third radio cell FZ3 exclusively for data transmission.

In a connection direction referred to as the "downlink" DL from the base station to the mobile station, each of the carrier frequencies f1 to f12 has seven timeslots TS1 to TS7 as transmission resources, while in a connection direction referred to as the "uplink" UL from the mobile station to the base station each of the carrier frequencies f1 to f12 has five timeslots TS1 to TS5 as transmission resources. Free, unused timeslots are assigned by way of example to the carrier frequencies f2, f7, and f11 and designated by the letter "F".

Figure 4:
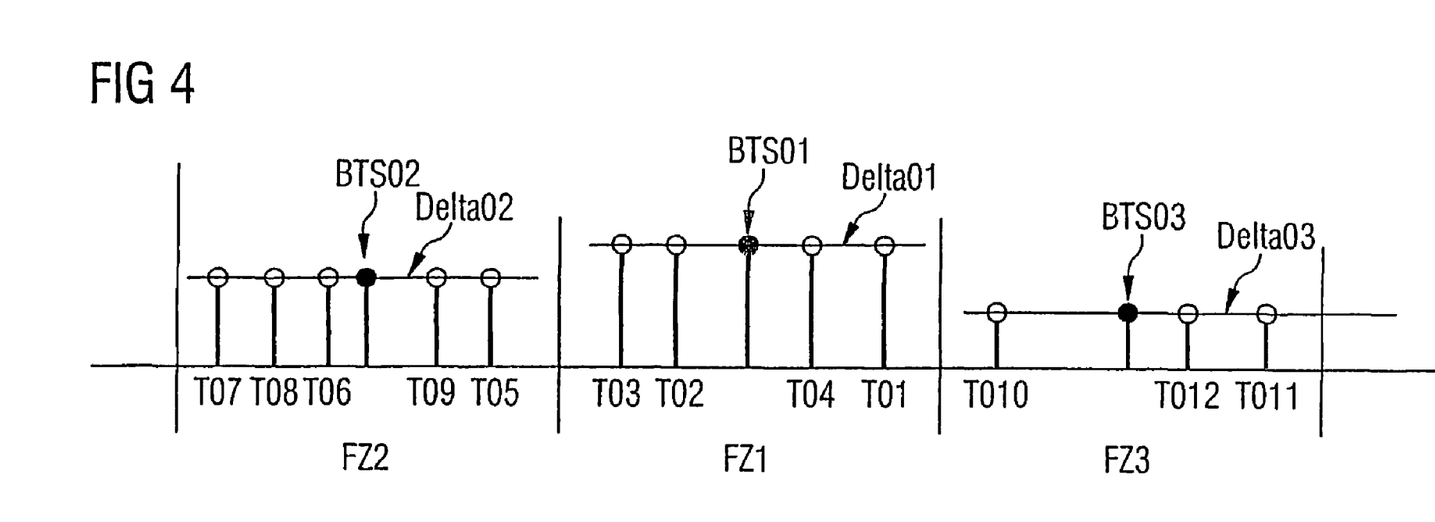
FIG. 4 shows the synchronization situation described in the introduction to the description and corresponding to the related art.

FIG. 4 is an overview showing a synchronization situation of the radio cells FZ1 to FZ3 depicted in FIG. 3 that corresponds to the related art.

The individual base stations BTS01 to BTS03 are neither frequency-nor time-synchronized with one another. A base-station-specific carrier frequency deviation Delta01 to Delta03 is plotted vertically in each case for each one of the base stations BTS01 to BTS03. Said carrier frequency deviation Delta01 to Delta03 is due in each of the individual base stations BTS01 to BTS03 to electrical components of the respective base station, for example to base-station-specific local oscillators. As the mobile stations T01 to T012 are synchronized to the respective assignable base station BTS01 to BTS03, the base stations BTS01 to BTS03 and the correspondingly assigned mobile stations T01 to T012 also have the respective carrier frequency deviations Delta01 to Delta03 with respect to one another.

SUMMARY OF THE INVENTION

It is one possible object of the present invention to implement a cellular radio communication system, in particular an OFDM radio transmission system, in such a way that, taking into account minimal co-channel interference, subscribers are provided with radio coverage both in the case of high and low traffic volumes while optimum use is made of radio transmission resources.

The invention propose that the number of active mobile stations is ascertained by a base station and said number is then compared with at least one predefined threshold value. A first or a second synchronization method is selected or, as the case may be, used depending on the threshold value or threshold values.

A predefined threshold value will be assumed in the following as a representative and exemplary instance.

Where there is a low number of active mobile stations, i.e. when said number falls below the predefined threshold value, a first synchronization method is used which is embodied in accordance with a transmission standard assigned to the radio communication system. With a UMTS radio communication system, for example, base station and mobile stations are synchronized on the basis of the assigned UMTS standard.

Where there is a high number of active mobile stations, i.e. when said number exceeds the predefined threshold value, a second synchronization method, described hereinafter, is used.

With the first synchronization method, a smaller number of active mobile stations is assumed compared with the second synchronization method, so in this case sufficient transmission capacity is present for a transmission of synchronization information.

Through the use of the first synchronization method for a small number of active mobile stations, a required synchronization accuracy is ensured.

Based on the second synchronization method, time and frequency synchronization is implemented in the cellular radio communication system in a simple manner. As the second synchronization method dispenses with a transmission of additional signaling information for the synchronization, which signaling information had hitherto to be exchanged between base station and mobile station at a higher protocol layer, radio transmission resources are freed up and remain available for performing transmissions of useful data (payload).

With the second synchronization method it is made especially advantageously possible for in particular adjacent base stations to utilize radio transmission resources from a stock that is collectively allocated to the base stations for data transmission. Particularly efficient radio resource management is facilitated thereby. Dynamic use of available radio transmission resources in the individual radio cells is introduced or, as the case may be, realized.

With the second synchronization method, available radio transmission resources are in each case optimally allocated in accordance with the traffic load at a given time, with unevenly distributed subscriber occupancies being particularly advantageously evened out.

With the second synchronization method, radio transmission resources are, in a preferred embodiment, allocated taking account of an interference situation in a radio transmission resource requiring to be selected. This will enable, for example, two adjacent base stations each individually providing radio coverage to a mobile station assigned to it to simultaneously employ a timeslot of a carrier frequency as the radio transmission resource for providing radio coverage to said mobile stations, provided the interference situation in the selected timeslot will allow this.

The radio transmissions resources are specified for example by timeslots of jointly allocated carrier frequencies.

The second synchronization method, which is implemented automatically and simply through signal processing and subsequent adjustment of a synchronization status of the base stations or, as the case may be, mobile stations on the receive side, results in dynamic use of available radio transmission resources in the individual radio cells. Available radio transmission resources are always optimally allocated in accordance with the traffic load at a given time, with unevenly distributed subscriber occupancies being particularly advantageously evened out.

The second synchronization method permits the use of interference suppression methods on the part of the base station and/or the mobile station, since interference suppression methods are optimized in particular for mutually synchronous payload and interference signals.

The second synchronization method enables further base stations to be added in a simple manner at a later time, for example in order to cater for large organized events, or, as the case may be, a change associated therewith to be made in the number of radio cells.

Both with the first and with the second synchronization method, the added base station will dynamically select radio transmission resources in such a way that co-channel interference with adjacent radio cells or, as the case may be, the mobile stations assigned to the radio cells in each case will be minimized.

The method is used particularly advantageously in an OFDM radio communication system employed especially preferably for services having high data rates.

The method also includes the selection or use of the synchronization method based on a plurality of threshold values. Using two threshold values, for example, a threshold value range is specified by which a "soft" selection or, as the case may be, switchover between the synchronization methods can be realized.

With the aid of a suitably specified threshold value range it will for example be possible to use a hysteresis function, possibly executed on a time-dependent basis, for the selection of the synchronization method.

The influence of at times poorly receivable mobile stations on the selection of the synchronization method is particularly advantageously reduced.

BRIEF DESCRIPTION OF THE DRAWINGS

These and other objects and advantages of the present invention will become more apparent and more readily appreciated from the following description of the preferred embodiments, taken in conjunction with the accompanying drawings of which.

The second synchronization method is explained in more detail below with the aid of a drawing, in which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
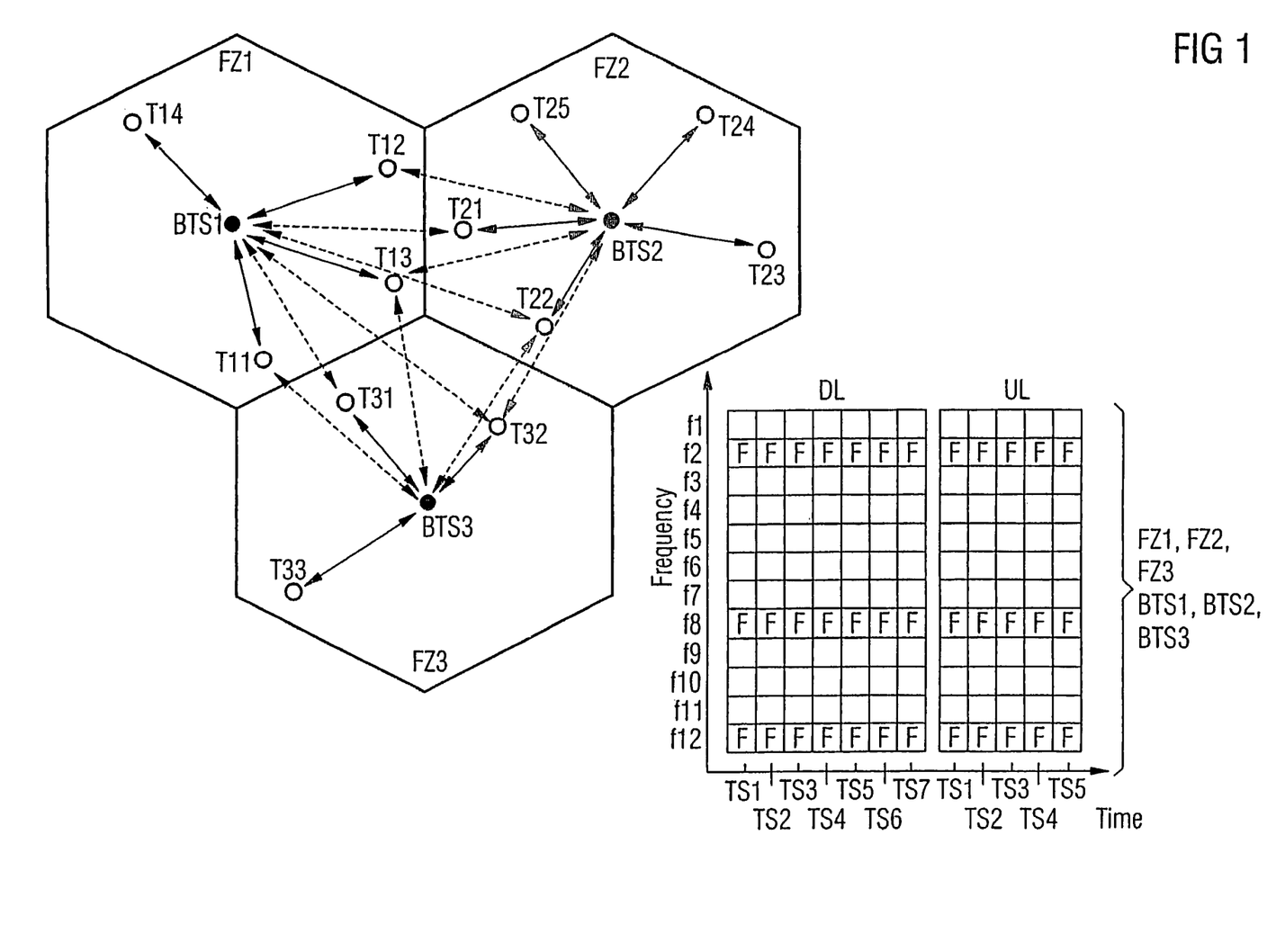
FIG. 1 shows an OFDM radio communication system using the second synchronization method according to one embodiment of the invention.

FIG. 1 shows, as a representative example of further mobile radio systems, an OFDM radio communication system using the second synchronization method according to one embodiment of the invention.

Three adjacent radio cells FZ1 to FZ3 each have an assigned base station BTS1 to BTS3. Each of the base stations BTS1 to BTS3 individually provides radio coverage to a number of mobile stations T11 to T33 assigned to the respective radio cell FZ1 to FZ3, with a total of four mobile stations T11 to T14 being assigned to a first base station BTS1 for providing radio coverage, while a total of five mobile stations T21 to T25 are allocated to a second base station BTS2 for providing radio coverage. A total of three mobile stations T31 to T33 are allocated to a third base station BTS3 for providing radio coverage.

For the transmission of subscriber data, all three base stations BTS1 to BTS3 employ on equal terms a common carrier frequency resource which has twelve carrier frequencies f1 to f12. Each of the carrier frequencies f1 to f12 has in a connection direction referred to as the "downlink" DL from the base station to the mobile station seven timeslots TS1 to TS7 as transmission resources, while each of the carrier frequencies f1 to f12 has in a connection direction referred to as the "uplink" UL from the mobile station to the base station five timeslots TS1 to TS5 as transmission resources. Free, unused timeslots, shown by way of example for the carrier frequencies f2, f8, and f12 are designated by the letter "F".

Compared with FIG. 3, the exclusive allocation of carrier frequencies f1 to f12 to base stations or, as the case may be, radio cells has been rescinded in this case by the second synchronization method.

The second synchronization method is explained in more detail below with the aid of the first radio cell FZ1 as a representative instance of the second and third radio cell FZ2 and FZ3, with the term "synchronization" here to be understood as both time synchronization of the timeslots of the carrier frequencies and frequency synchronization of the carrier frequencies.

As well as signals of the mobile stations T11 to T14 assigned to it, the first base station BTS1 of the first radio cell FZ1 also receives in addition signals from mobile stations of the adjacent radio cells FZ2 and FZ3 on the uplink UL. Said reception takes place automatically with no additional monitoring of other frequency bands.

For example, the first base station BTS1 also receives signals of the mobile stations T21 and T22 of the second radio cell FZ2 and signals of the mobile stations T31 and T32 of the third radio cell FZ3 on the uplink. The first base station BTS1 determines a first time deviation and a first frequency deviation based on the received mobile station signals of the adjacent radio cells FZ2 and FZ3 and from these values derives a suitable time synchronization value and a frequency synchronization value to which the first base station BTS1 finally synchronizes itself. This is explained by way of example in the following FIG. 2.

Viewed as representative of all the mobile stations, in addition to signals of the base station BTS1 of its own radio cell FZ1 a third mobile station T13 of the first radio cell FZ1 also receives signals of the adjacent base stations BTS2 and BTS3 of the radio cells FZ2 and FZ3 on a downlink DL. The third mobile station T13 then determines a second time deviation and a second frequency deviation based on the received base station signals and from these values derives a suitable time synchronization value and a frequency synchronization value to which the mobile station T13 finally synchronizes itself.

The second synchronization method is repeated, for example, frame by frame, as a result of which, time-averaged, a precise, self-organizing time and frequency synchronization will be obtained.

By the second synchronization method, particularly flexibly and adaptively implemented radio resource management is especially advantageously realized since all the base stations are able to access a common stock of radio transmission resources, with, for example, carrier frequencies being selected taking account of minimal co-channel interference. Transmission resources are allocated to mobile stations exclusively by the base station respectively assigned to the respective mobile station.

The rescinded exclusive allocation of carrier frequencies to base stations or, as the case may be, radio cells enables, for example, the base station BTS1 and the base station BTS3 to use the timeslot TS5 of the carrier frequency f5 simultaneously for providing radio coverage to the mobile station T14 and the mobile station T32, respectively, if the interference situation in the timeslot TS5 allows this. Said interference situation is influenced by, for example, sectorized receiving and/or transmitting antennas on the base stations or by propagation characteristics of the radio signals or by the spatial distance between the subscribers, etc.

With sectorization, a base station for transmitting and/or receiving radio signals has, for example, three antenna arrays, each one of which individually provides radio coverage to a sector with a beam angle of 120°. A spatial separation or, as the case may be, differentiation between radio signals is achieved thereby and, depending on the choice of the beam angle of the sector, an improvement in an interference situation achieved.

In the event of inhomogeneous radio cell utilization, each of the three base stations can, as needs dictate, access transmission resources of the carrier frequencies either entirely or only partially, as a result of which bottlenecks in the individual radio cells are avoided when there is a simultaneously prevailing overcapacity in individual radio cells.

The second synchronization method is performed automatically and requires neither complex signaling overhead nor complex GPS time synchronization overhead.

Figure 2:
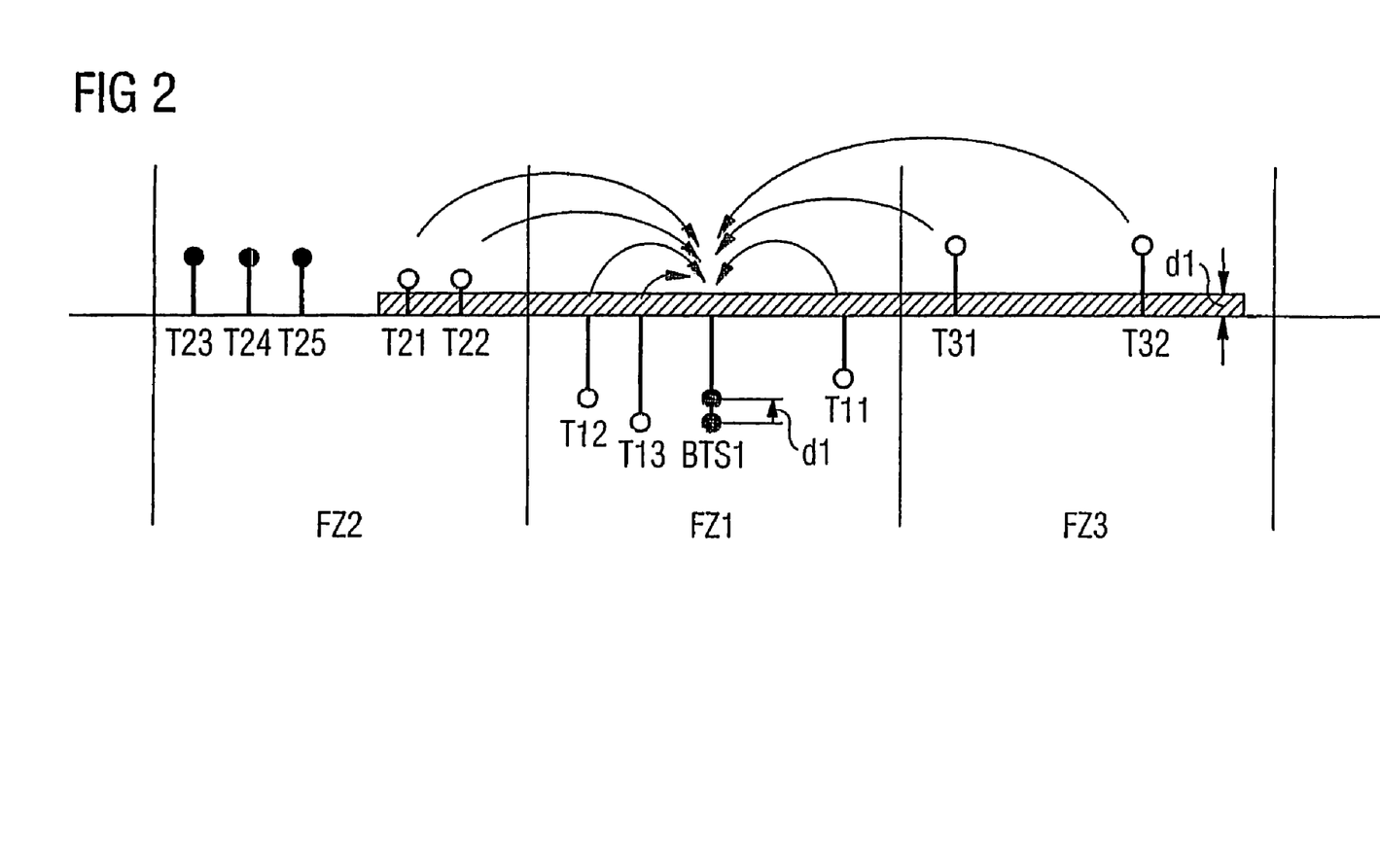
FIG. 2 shows a second synchronization according to one embodiment of the invention performed on the part of a base station shown in FIG. 1.

FIG. 2 shows, referred to FIG. 1, a second synchronization method performed on the part of the base station BTS1.

A mobile-station-specific carrier frequency deviation is in each case plotted vertically for each individual mobile station. The first base station BTS1 under consideration receives on the uplink UL signals sent by the mobile stations T21, T22, T12, T13, T11, T31, and T32 and from said signals determines a synchronization value d1, represented here by way of example as a mean value by a hatched rectangle. The base station BTS1 corrects its synchronization accordingly in the direction of the positive synchronization value d1. The same applies analogously to the further base stations BTS2 and BTS3.

The respective mobile stations are synchronized in a manner comparable to the above, though this is not described in further detail here.

If a TDMA/FDMA multiple access method is employed in the above-mentioned cellular radio communication network, either one on its own or both in combination, and if what is termed a time-division duplex (TDD) transmission mode is considered for transmission, then a signal r(t) received at the base station will has an overlaying of a plurality of signals of all the radio cells' mobile stations transmitting simultaneously using the FDMA multiple access method.

From the received signal r(t), each base station determines the mean receive instant of overlaid OFDM symbols of the mobile stations located in the adjacent radio cells.

With the aid of a correlation of adjacent sampled values arranged having a spacing of an OFDM symbol length N, the result for a sampled value k is a metric λ(k) whose values also have periodic values in the case of an FDMA uplink having the OFDM symbol length N.

The following applies:

$$\lambda(k) = \Sigma_{m=0}^{M-1} r(k+m) r^*(k+m+N)$$

where M stands for a window length across which metric values are averaged for noise reduction purposes. Said length is as a rule identical to the length of what is termed a "guard interval". A different length of a spacing N is in certain circumstances chosen from correlated values and the window length M for improving detection characteristics.

At the position of the mean time deviation of the signal components of the mobile stations at a respective base station, the absolute value of the metric |λ(k)| assumes a value that is proportional to the total power of the signals of the mobile stations received from this cell. For this reason the maximum absolute value of the metric |λ(k)| is sought after the metric values have been calculated and the position of the maximum absolute value continues being used as an estimation value for the time offset of the respective base station. The metric values will be complex if a residual carrier frequency deviation remains, which is why an approximation of the mean carrier frequency deviation of the signals received in the OFDM symbol can be determined from the phase measured in the metric maximum for small values of the carrier frequency deviation.

To separate the FDMA signals of different mobile stations, the received signal is advantageously evaluated in the frequency range as these are assigned to different subcarriers. The respective carrier frequency deviation will in this case result from a phase rotation of the OFDM symbols received on each subcarrier.

The frequency deviation of a partial carrier frequency δf(k) is herein the result of the phase change in the transmission factors H(n,k) of a partial carrier frequency k between two consecutive OFDM symbols having a time index n and n+1 with a temporal spacing $T_S$. The following thus applies:

From the values of the carrier frequency deviation of the adjacent radio cells that were estimated to be present in the frequency range, a, for example, mean carrier frequency deviation of the mobile stations received from the adjacent radio cells is determined following an evaluation in accordance with the quality of the estimation.

$$\delta f(k) = \frac{1}{2\pi} \angle \left\{ \frac{H(n+1,k)}{H(n,k)} \right\} \frac{1}{T_S}$$

The respective time deviation will be determined from the phase rotation between the subcarriers of a received OFDM symbol by a mobile station assigned to the same base station. From the values of the time deviation that are obtained after the estimation in the frequency range, a, for example, mean time deviation of the mobile stations received from the adjacent radio cells is determined following an evaluation in accordance with the quality of the estimation.

With the aid of the determined time deviation and carrier frequency deviation, each base station adjusts its respective own carrier frequency and own transmitting instant in accordance with the determined values. Given a suitably designed control loop filter, this operation will automatically result in a convergent estimation. The following steps are required for the second synchronization method according to the invention when a base station is to be newly added to a TDD radio communication system:

The following steps are requires for the second synchronization method when a base station is to be newly added to a TSS radio communication system:

uplink and downlink monitoring to determine a TDD frame structure, determining the absolute transmitting instant of all measured receiving instants, and evaluating the signals according to the above-cited scheme.

In each uplink phase, each base station determines signal powers of the mobile stations that are active in the radio cell and the co-channel interference powers originating from the adjacent radio cells for each subcarrier.

Based on this information, each base station makes an independent decision about a bandwidth to be occupied. Those subcarriers having a minimum interference power are selected, with the base station making an adaptive decision, as a function of an achievable channel quality, about the position and number of subcarriers to be occupied and of the physical transmission parameters to be used in order to be able to provide optimal radio coverage to the mobile stations located within the radio cell. Organization across different cells is not required.

This type of multiple access avoids interference within a radio cell and between mobile stations of adjacent radio cells. Self-organizing optimization of a multiple access method employed is performed across different radio cells. This is done taking account of the radio transmission channel characteristics and of the momentary interference situation in a cellular environment.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for synchronizing a radio communication system divided up into radio cells, comprising:

transmitting data by a timeslot multiple access method with each radio cell having a base station for providing radio coverage to a plurality of mobile stations assigned to the radio cell;

receiving at each base station signals from mobile stations assigned to the radio cell of the base station and signals from mobile stations assigned to adjacent radio cells;

determining the number of mobile stations at the base station, on the basis of the signals received from the mobile stations and comparing the number at the base station with a predefined threshold value;

if the number of mobile stations is below the threshold value, then using a first synchronization method for synchronizing the base station and the mobile stations assigned to the base station, the first synchronization method corresponding to an assigned transmission standard of the radio communication system;

if the number of mobile stations exceeds the threshold value, then using a second synchronization method in which the base station evaluates the signals received from the mobile stations to determine a time synchronization value and a frequency synchronization value to which the base station synchronizes itself;

if the number of mobile stations exceeds the threshold value, then receiving at the mobile station a signal from the base station of the radio cell to which the mobile station is assigned and signals from base stations of adjacent radio cells; and if the number of mobile stations exceeds the threshold value, then evaluating the base station signals received at the mobile station to determine a time synchronization value and a frequency synchronization value to which the mobile station synchronizes itself.

2. The method as claimed in claim 1, wherein base stations of adjacent radio cells use radio transmission resources from a stock that is collectively assigned to the base stations for data transmission purposes.

3. The method as claimed in claim 1, wherein with the second synchronization method each base station uses timeslots from carrier frequencies collectively assigned to the base station and base stations of adjacent radio cells, the timeslots being used as radio transmission resources.

4. The method as claimed in claim 1, wherein
with the second synchronization method base stations of at least two adjacent radio cells simultaneously and jointly employ a common timeslot of a common carrier frequency for providing radio coverage to respectively assigned mobile stations, and
the common timeslot is selected from collectively assigned radio transmission resources taking account of an interference situation in the common timeslot.

5. The method as claimed in one of the preceding claims, wherein with the second synchronization method both the base station and the mobile stations adjust carrier frequencies and timeslot transmitting instants on a subscriber-specific basis.

6. The method as claimed in any one of claims 1-4, wherein co-channel interference is minimized at the base station and/or the mobile stations using an interference suppression method.

7. The method as claimed in claim 1, wherein radio transmission resources are assigned at each base station in such a way that co-channel interference on adjacent radio cells is minimized.

8. The method as claimed in claim 1, wherein the radio communication system uses an OFDM radio transmission method.

9. The method as claimed in claim 1, wherein the radio communication system uses a TDD or FDD radio transmission method.

10. The method as claimed in claim 1, wherein with the second synchronization method a time deviation is determined by correlation and a frequency deviation is determined by ascertaining a phase rotation of consecutive symbols following a transformation into the frequency range.

11. The method as claimed in claim 1, wherein the second synchronization method is performed without additional signaling using a higher protocol layer between the base station and mobile stations assigned to the radio cell of the base station.

12. The method as claimed in claim 1, wherein to select the first or second synchronization method, the number of mobile stations is compared using a time-dependent hysteresis function specified by a threshold value range.

13. The method as claimed in claim 2, wherein with the second synchronization method each base station uses timeslots from carrier frequencies collectively assigned to the base station and base stations of adjacent radio cells, the timeslots being used as radio transmission resources.

14. The method as claimed in claim 13, wherein
with the second synchronization method base stations of at least two adjacent radio cells simultaneously and jointly employ a common timeslot of a common carrier frequency for providing radio coverage to respectively assigned mobile stations, and
the common timeslot is selected from collectively assigned radio transmission resources taking account of an interference situation in the common timeslot.

15. The method as claimed in 14, wherein with the second synchronization method both the base station and the mobile stations adjust carrier frequencies and timeslot transmitting instants on a subscriber-specific basis.

16. The method as claimed in claim 15, wherein co-channel interference is minimized at the base station and/or the mobile stations using an interference suppression method.

17. The method as claimed in claim 16, wherein radio transmission resources are assigned at each base station in such a way that co-channel interference on adjacent radio cells is minimized.

18. The method as claimed in claim 17, wherein the radio communication system uses an OFDM radio transmission method.

19. The method as claimed in claim 18, wherein the radio communication system uses a TDD or FDD radio transmission method.

20. The method as claimed in claim 19, wherein with the second synchronization method a time deviation is determined by correlation and a frequency deviation is determined by ascertaining a phase rotation of consecutive symbols following a transformation into the frequency range.

* * * * *